INVENTORS
Joseph V. Baum
Donald E. Roop
BY
J.W. Copeland Jr.
AGENT

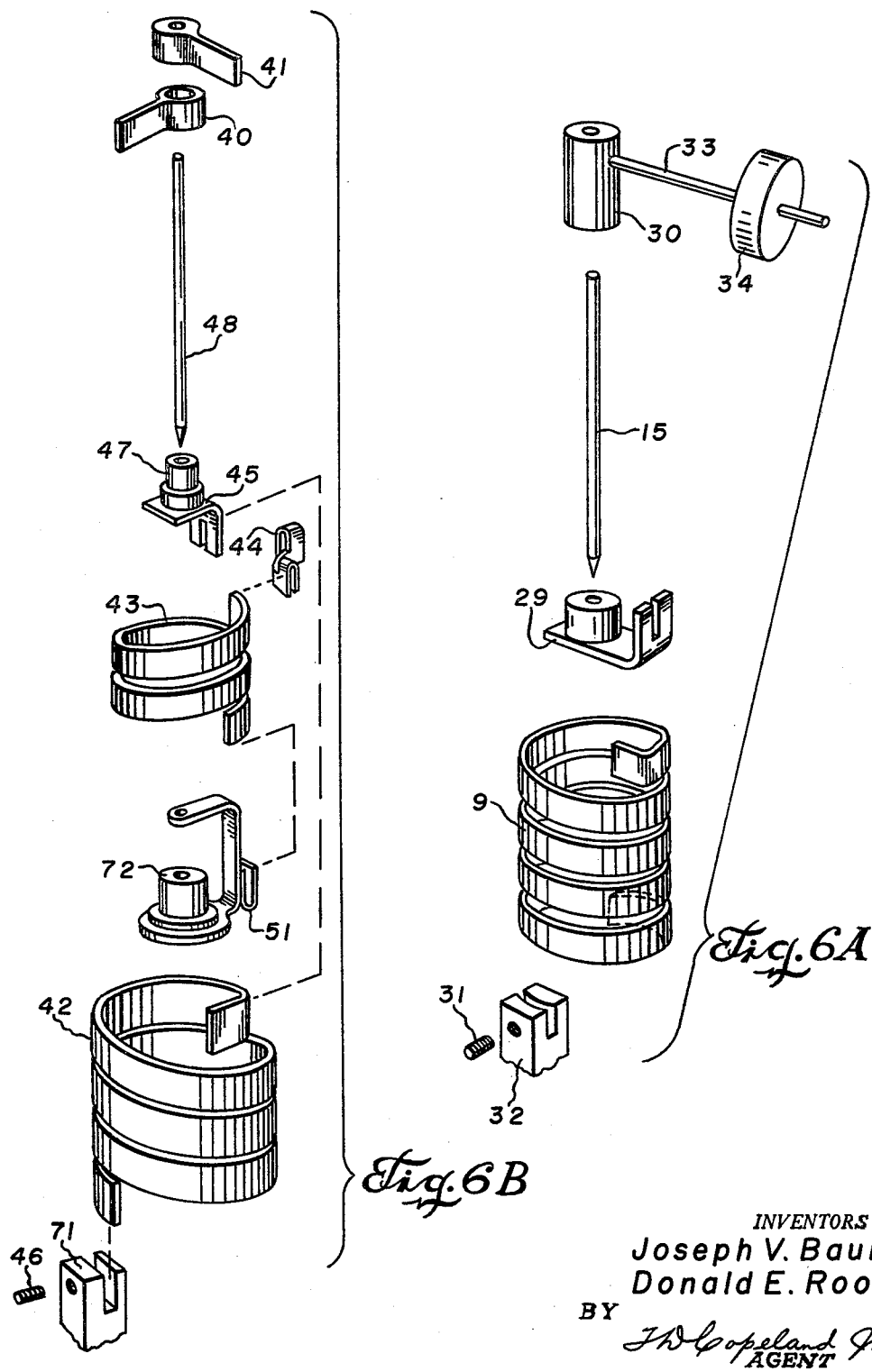

United States Patent Office 3,059,465
Patented Oct. 23, 1962

3,059,465
GAS DETECTOR INCORPORATING COMPENSATION FOR ATMOSPHERIC CONDITIONS
Joseph V. Baum and Donald E. Roop, Columbus, Ohio, assignors, by mesne assignments, to Texas Instruments Incorporated, Dallas, Tex., a corporation of Delaware
Filed Nov. 4, 1960, Ser. No. 67,365
6 Claims. (Cl. 73—30)

This invention relates to gas detecting apparatus and more particularly to such apparatus having compensating elements sensitive to variations in atmospheric conditions.

Gas detectors are devices for determining the presence of undesirable and possibly explosive gases which may be present in the atmosphere. Such detectors have come into prominence with the advent of the gas-producing, transporting and distributing industry which is providing gas for increasing numbers of private and public consumers.

Consumers of gas are constantly subjected to the hazard of gas leakage in areas where accumulations of the gas could cause disastrous explosions and fires, endangering human life and costly equipment.

Moreover, subterranean mine disasters caused by accumulations of explosive gases have created a wide interest in the field of mine safety for gas detectors to signal the presence of conditions which might eventuate into disaster.

Some density-sensitive gas detector designs provide a hollow container or float counterbalanced by a weight or, in some cases, a spring; when the density of the surrounding atmosphere changes, unbalancing of the system occurs. If such a detector becomes unbalanced, a switch mechanism is actuated to initiate an alarm system that indicates that the density of the surrounding atmosphere has changed.

If there are no relative density changes between the air in a float and the surrounding atmosphere, the buoyant force of the atmosphere exerted on the float will maintain balance of the system. However, if the density of the air surrounding the float is decreased, then the buoyant force supporting the float will be decreased, and the float will descend. Conversely, if the density of the air surrounding the float is increased, the buoyant force will be increased and the float will ascend.

Natural gas, which is by far the most widely used gas utility, has a density less than air. Thus, many gas detectors are designed to operate an alarm system only when the density of the surrounding atmosphere is decreased. Although natural gas, due to its wide use, may create a hazard, many undesirable, noxious, and perhaps poisonous, gases having specific gravities greater than air may create hazardous conditions which may be avoided by gas detectors which detect the presence of all gases other than air.

In many of the prior art systems, once the float had been charged with air or an appropriate gas, it was sealed, and the volume and weight of air in the container was fixed; hence, the density of the gas in the float was constant regardless of changing atmospheric conditions surrounding the float. In some cases, where such devices would not be operated in extreme environments and would not be subjected to extreme environmental changes, no compensation was provided to adjust the detectors to prevent actuation of the alarm system occurring with mere environmental atmospheric-effected density changes. In some of these detectors, sensitivity adjustments were provided to prevent erroneous detections over limited ranges of atmospheric temperature, pressure, and humidity.

One technique which was used in some of the prior art detectors for compensating for temperature variations was to provide at one end of the beam balance a weight suspended on a bimetallic strip. By this means, when the atmospheric temperature changed, the bimetallic strip would be deflected in one direction. Such a deflection creates a substantially linear movement of the weight along the balance beam, thereby changing the moment of the weight around the fulcrum. Hence, this provides compensation by readjusting the lever arm length to offset the buoyant force change caused by a temperature-effected density change.

The above-mentioned temperature compensating means is useful only over a small range of temperature change in which reasonably accurate compensation would be obtained by linear movement to change the moment around the fulcrum. Actually, the change in moment of the float around the fulcrum incurred from a decrease in buoyant force attributable to temperature-effected density changes follows a trigonometrical relation rather than a linear relation. For this reason, significant temperature changes would not be compensated accurately.

The effect of pressure variations on density is known; however, most gas detectors do not provide compensation for variations in pressure of the environment in which the detector must operate. Failure to provide pressure compensation in a gas detector reduces its sensitivity in detecting the presence of undesirable gases.

In most prior systems, no compensation was provided for changes of relative humidity of the environment in which the detector was designed to operate, although minor changes in humidity would significantly effect the operation of such detectors.

The present invention is an improved density-sensitive, balance-type gas detector providing features lacking in the prior art detectors. Previously, gas detectors are designed without complete consideration of the ideal gas law ($PV=nRT$ where P is pressure, V is volume, $n$ is mole fraction, R is the universal gas constant, and T is absolute temperature) which, if studied, would reveal the facts that buoyant force changes vary as a linear function with pressure and a trigonometrical function with temperature and humidity. These relations are advantageously employed in the present improved gas detector by providing mechanical compensators which operate to equalize (or zero) the force moments about the balance fulcrum created by pressure, temperature and humidity-effected buoyant force changes (density changes).

These mechanical compensators allow the detector to remain stabilized, independent of atmospheric changes in temperature over a range of $-20°$ F. to $+150°$ F., in humidity over a range of 0% to 100% relative humidity, and in pressure over a range of 23 inches of mercury to 31 inches of mercury. It should be understood, however, that various modifications and changes may be made within the broad principles of the present invention whereby the environmental stability range may be increased.

The detector of the present invention is compensated for variations in atmospheric pressure by providing a double diaphragm aneroid bellows mounted axially to the balance arm. As atmospheric pressure changes, a weight attached to the bellows moves linearly in a plane parallel to the balance arm assembly, thereby changing the moment of the weight about the fulcrum to the same amount as the change in moment of the float created by atmospheric pressure-effected density changes of the surrounding atmosphere.

Temperature compensation is provided in the present invention by changing the moment of a weight around the fulcrum of the balance. The weight is mounted on a bimetallic helix affixed to the balance arm assembly. As temperature changes, the bimetallic helix rotates the weight through an arc in a horizontal plane, thereby correcting the force moments around the balance to equal zero. The rotation of the temperature compensator weight provides correction of the moment forces around the fulcrum as a sinusoidal function of temperature, thereby more nearly matching the true effect of the change in buoyant force exhibited by the temperature-effected density change.

Buoyant force changes caused by humidity-effected atmospheric density variations are compensated by a weight of fixed size being rotated through an arc in a horizontal plane by a combination mechanism of a calibrated bimetallic helix attached to a calibrated hygroscopic helix mounted on the balance arm assembly. The hygroscopic helix absorbs moisture as the relative humidity varies, which causes this helix to expand or contracts its helical length, thereby rotating a weight in the horizontal plane. Inasmuch as density variations caused by humidity are of different magnitudes at various temperatures, the bimetallic helix is provided to rotate the hygroscopic helix attached to it as temperature changes occur, thereby correcting the position of the hygroscopic helix to maintain the proper correction for density with changes of relative humidity at various temperatures. Since density changes due solely to temperature are equalized by another compensator, the bimetallic helix coupled to the hygroscopic helix carries a counterweight to compensate for movement of the humidity weight which was caused by rotation of the bimetallic helix alone.

The aforementioned compensation for humidiy-effected atmospheric density variations provides a change in force moment about the balance oppositely equivalent to the change in force moment of the float caused by the humidity-effected density change or buoyant force change.

It is therefore an object of the present invention to provide a gas detector which is continuously compensated for variations in atmospheric pressure, temperature and humidity.

It is another object of the present invention to provide a humidity compensator to countervail density-sensitive gas detectors for humidity-effected density changes as a trigonometric function of relative humidity.

It is another object of the present invention to provide a density-sensitive gas detector having a compensator to countervail for temperature-effected density changes as a trigonometric function of temperature change.

It is still another object of the present invention to provide a density-sensitive gas detector linearly compensated for changes in atmospheric pressure.

It is a further object of the present invention to provide a density-sensitive gas detector having a humidity compensator to countervail for humidity-effected density changes as a trigonometric function of relative humidity at various temperatures.

It is another further object of the present invention to provide a gas detector having a magnetic restraining system providing limited stability against vibration, shock, etc.

It is a still further object of the present invention to provide a gas detector capable of detecting and signaling the presence of gases which change the atmospheric density more than 1.2% independent of atmospheric temperature, pressure and humidity-effected density variations.

It is also a still further object of the present invention to provide a gas detector insensitive to atmospheric changes in temperature from −20° F. to 150° F., in pressure from 23 inches of mercury to 31 inches of mercury and in humidity from 0% to 100% relative humidity, but sensitive to atmospheric density changes of more than 1.2% attributable to the presence around the detector of gases foreign to the environment.

These and other objects of the present invention will be best understood from the following detailed description taken in connection with the drawings in which:

FIGURE 6A is an exploded view of the temperature compensator utilized to illustrate the features of the present invention; and FIGURE 6B illustrates in an exploded view the features of the humidity compensator.

Figure 1:
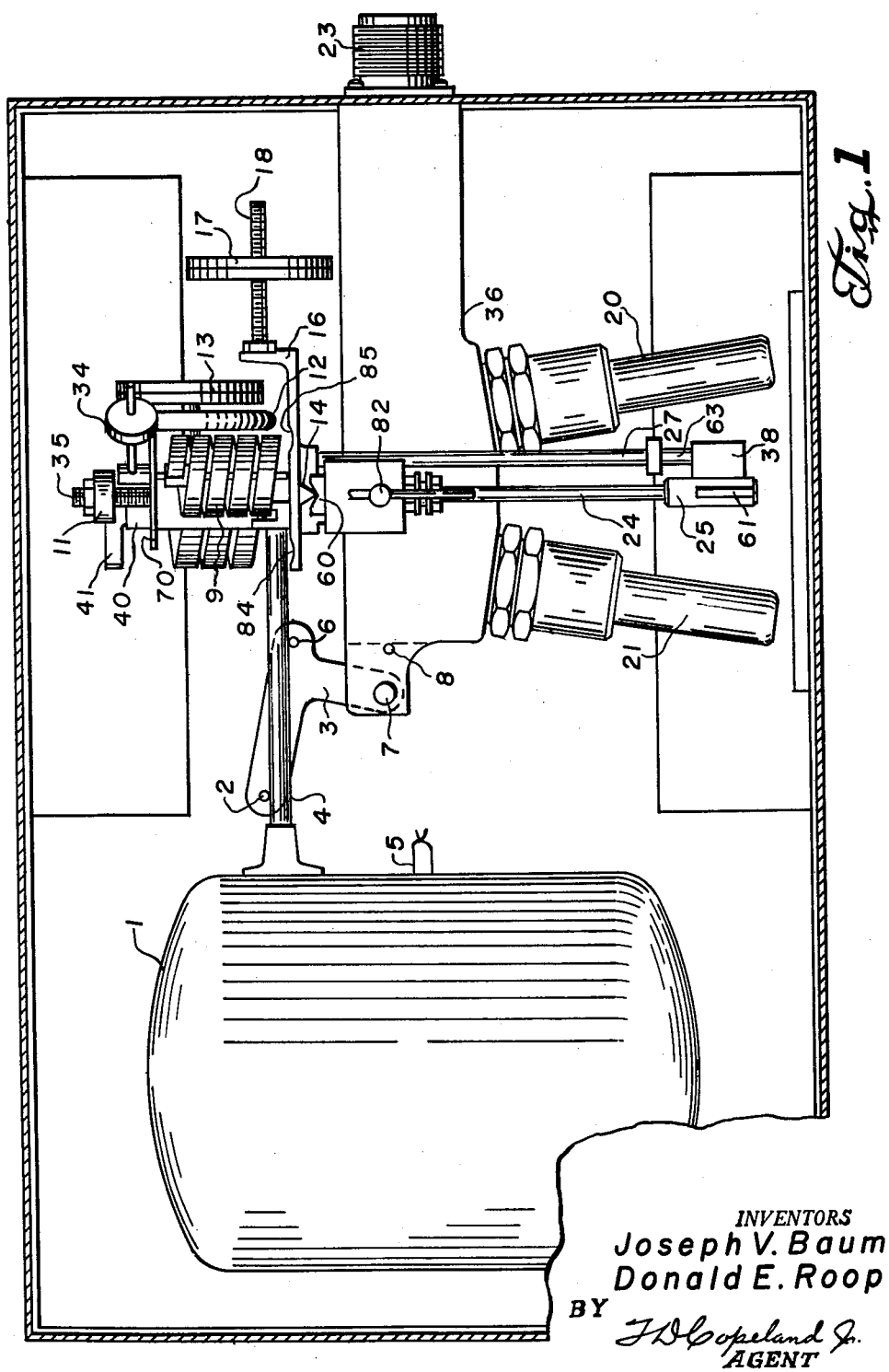
FIGURE 1 is a side elevational view of the apparatus illustrating the balance system and the compensators therefor.
Figure 2:
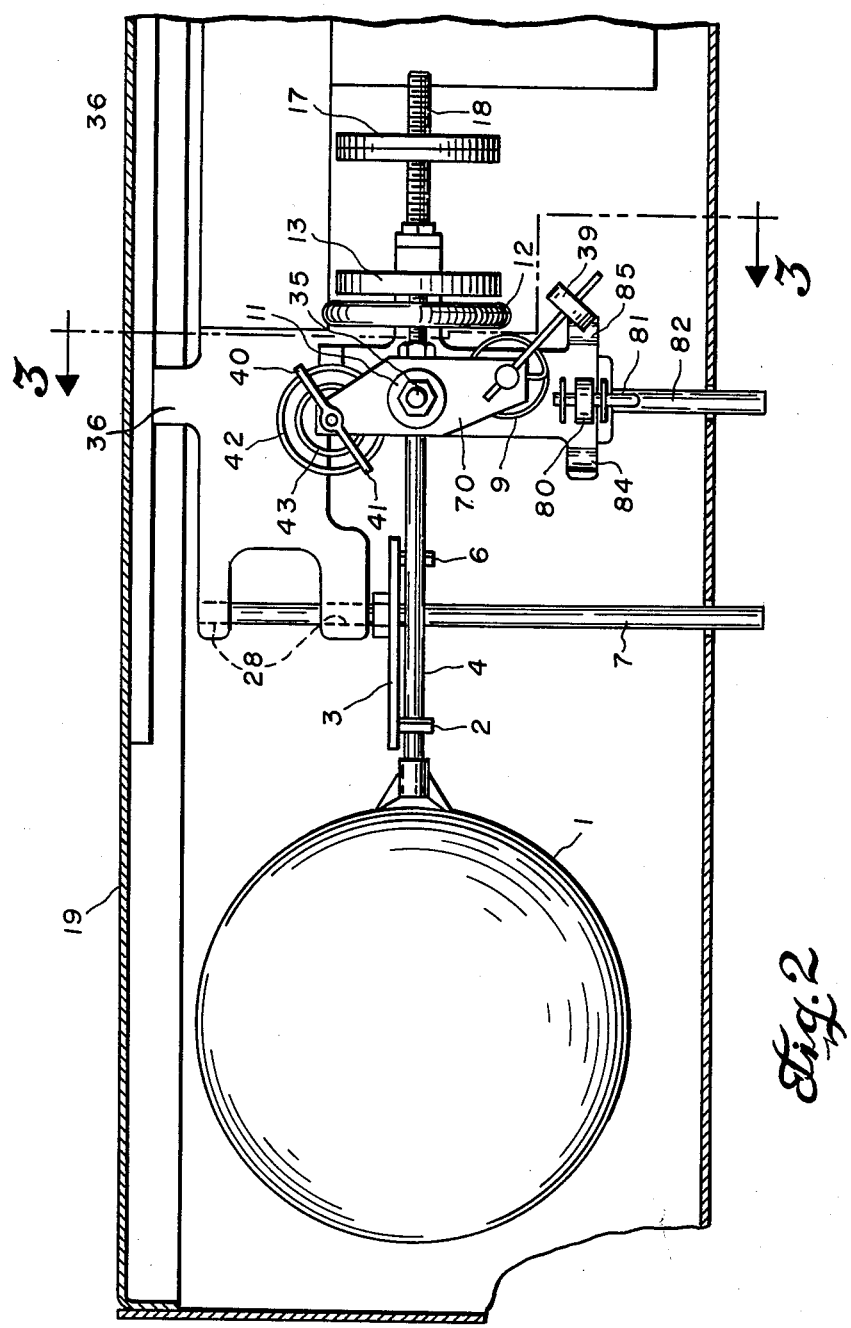
FIGURE 2 is a partial top view of the apparatus illustrated in FIGURE 1 further depicting the temperature, pressure and humidity compensators.

As illustrated in FIGURE 1, the balance arm of the gas detector is pivoted on knife edge pivot 14. Supported on knife edge 14 and integral therewith is a compensator mounting base 16 which is a portion of the balance arm. Attached to base 16 is an arm 4 to which container or float 1 is attached. A tube 5 is provided to allow float 1 to be filled with a standard gas after which tube 5 is crimped to seal float 1. At the opposite end of base 16 is a threaded stud 18 on which is mounted threaded counterweight 17 and may be adjusted lengthwise along the threads of stud 18 by rotational movement. A reset plate 3 is rotationally mounted by shaft 7 in bearing 28. (This is best illustrated in FIGURE 2.) Plate 3 is provided with pins 2 and 6 for the purpose of resetting the zero position of the balance mechanism once unbalancing occurs. When the gas detector is to be operated, the reset shaft 7 is pivoted clockwise and the plate 3 is allowed to rest against stop 8.

The sensitivity of the balance may be adjusted by rotational movement of nut 11 on threaded shaft 35 which is affixed to the plate 70 of base 16. Mount casting 36 provides a rigid support for the balance assembly on pivot bearing 60.

As the magnetic restraining feature (which may be best understood with reference to FIGURES 1 and 3), attached to mount casting 36 is a rod 24 which extends downwardly and its lower end is provided with a pole piece clamp 25 holding pole piece 61 and magnet 37. The balance assembly trip rod 27 is attached to base 16. At the lower end of rod 27 is attached magnet holder 63, trip magnet 64, and restraining magnet 38 (see FIGURE 3). Magnet 37 has a 30° wedge-shaped end which concentrates the magnetic flux, thereby sharply defining the field of attracting force between restraining magnet 38 and magnet 37. The just described magnetic system provides a restraining force against relative movement of the balance assembly base 16 with respect to the mount casting 36 which prevents shock and vibration from causing the balance system to become unbalanced and actuate an alarm. Furthermore, this system provides additional sensitivity control of the balance system. The sensitivity may be increased or decreased by moving pole piece 61 with magnet 37 attached thereto in pole piece clamp 25 to increase or decrease the force of attraction between magnet 37 and restraining magnet 38.

Figure 3:
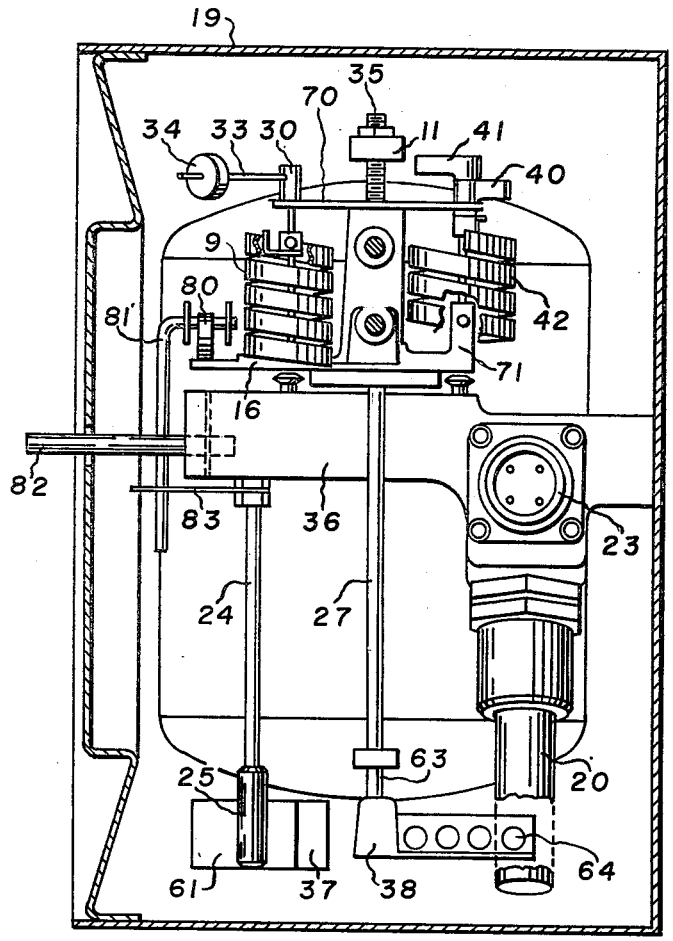
FIGURE 3 is an end elevational view partly in section taken along the lines 3—3 in FIGURE 2.

In order that the gas detector may be tested to determine if it is properly operating, a ring weight 80 resting on rod 81 is provided, as illustrated in FIGURE 3. In testing, operating rod 82 which is rigidly affixed to rod 81 is rotated deflecting wire spring 83 and moving ring weight 80 into groove 84 or 85 on compensator base 16, where ring weight 80 rests free of support from rod 81, thereby providing a test unbalance force moment. As operating rod 82 is released, wire spring 83 returns rod 81 to its center position. Weight 80 is selected to provide just enough force moment to operate the alarm system at the threshold activation level desired.

For alarm purposes, magnetically actuated mercury switches (not shown) are provided in housings 20 and 21 which are explosion-proof casings, allowing electrical interconnection of the switches through explosion-proof mount casting 36 outside of gas detector housing 19 to electrical connector jack 23.

In operation, when a gas other than air surrounds float 1, the system will become unbalanced due to the change in the density or weight of the atmosphere displaced by float 1. If the weight of the surrounding atmosphere displaced by the volume of float 1 decreases, then float 1 will descend, causing rotational movement of the trip rod 27 and trip magnet 38 about knife edge pivot 14. As magnet 38 approaches the proximity of housing 20, the enclosed magnetically actuated mercury switch will operate to complete an electrical circuit to connector jack 23, which is externally connected to actuate an alarm which is not shown.

It should be appreciated that in some applications of the density-sensitive gas detector, it may be used to complete circuits which would operate shut-off valves and the like to prevent further escape of undesirable gas.

As a specific example of the balance, float 1 is approximately 7 inches long with a 5 inch inside diameter and made from stainless steel about 2 mils thick. This provides float 1 with a volume of approximately 0.070 cubic feet having a weight of approximately 65 grams. Tube 5 is about one-half of an inch long and 100 mils in diameter. Actually, any lightweight material which is impermeable to gas would make a suitable float. Compensator mounting base 16 is made of cast aluminum, since aluminum is relatively lightweight, and it is desirable, although not absolutely necessary, to have a lightweight compensator mounting base. Mount casting 36 is made of aluminum and supports pivot 14 on an agate stone pivot bearing 60. The knife edge pivot 14 is made of hardened stainless steel, but could be made of any other suitable material. Arm 4 is a quarter-inch diameter polyester glass fiber drawn rod about 5 inches long, which is marketed under the name "glasdramatic" by Polygon Plastics Company. The thermal coefficient of expansion of this material is less than that of type 303 stainless steel, which also would be a suitable material for arm 4. The reset plate 3 is made of aluminum; however, any material which is convenient to perform the function of the reset plate 3 would be satisfactory. Shaft 7 is made of stainless steel, but could be made of any suitable rod material. The counterweight 17 is nickel-plated brass and weighs approximately 75 grams.

The foregoing specific example is a suitable balance system incorporating the novel magnetic restraining system of the present invention, and is designed to advantageously employ the novel temperature, pressure and humidity compensators described hereinafter. It should be appreciated that, although the compensators of the present invention are described with respect to the aforementioned balance system, many of the density-sensitive gas detector designs could obviously be suitably modified to incorporate the compensators of the present invention.

As viewed in FIGURE 1, pressure compensation is provided by bellows 12 which is mounted to one side of the base 16 with a weight 13 suspended from the bellows 12. Weight 13 is shifted linearly right or left as the bellows 12 expands or contracts changing the force moment around the fulcrum of knife edge pivot 14 to countervail the force moment created by pressure-effected density changes. As a specific example of a suitable pressure compensator to be used in the aforementioned balance system, bellows 12 is made of Type 303 stainless steel about 2 inches in diameter, and provides linear movement of approximately 0.05 inch per inch of mercury change in barometric pressure. Beryllium copper or other suitable material may be used for bellows 12. The weight 13 is nickel-plated brass and weighs approximately 118 grams.

Figure 4:
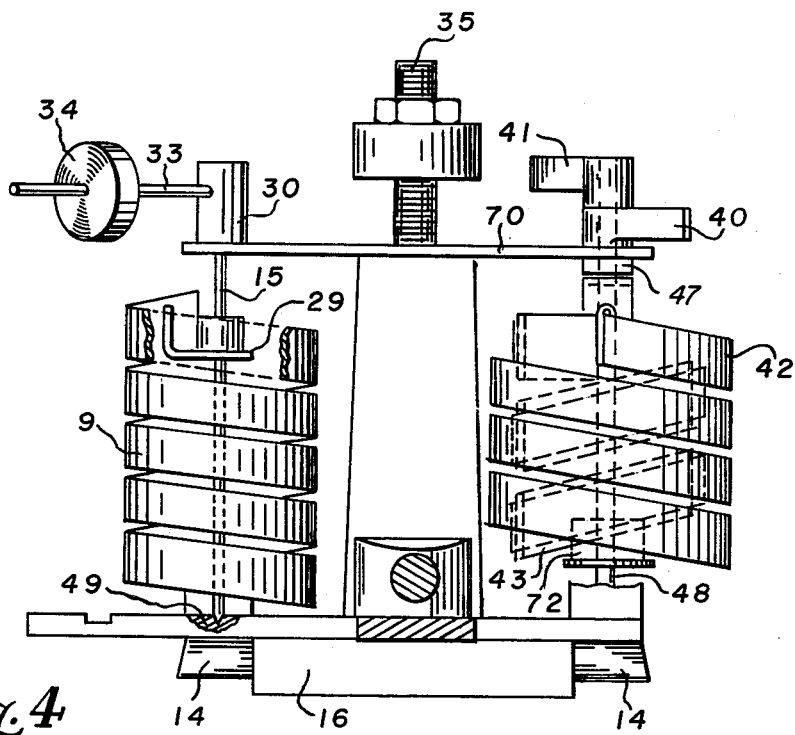
FIGURE 4 illustrates in an elevational view the mounting of the temperature and humidity compensators.
Figure 5:
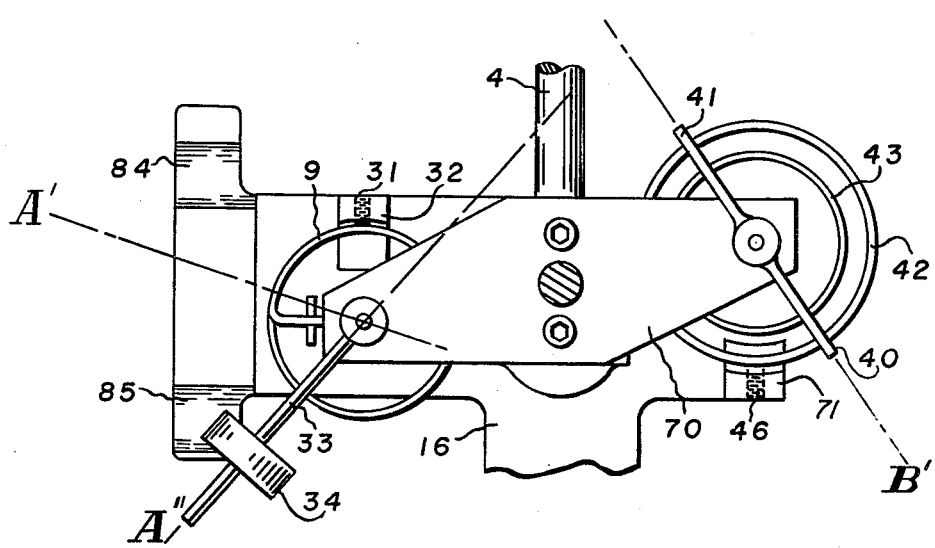
FIGURE 5 illustrates the orientation of the temperature and humidity compensator weights.

As best illustrated in FIGURES 4, 5 and 6A, the temperature compensator consists of bimetallic helix 9, one end of which extends radially toward shaft 15 and is affixed thereto by bracket 29. The other end of the helix 9 is affixed rigidly to base 16 by holding boss 32 and set screw 31. Attached to shaft 15 is hub 30 with a rod 33 rigidly affixed thereto which supports weight 34 in a horizontal plane. Shaft 15 is mounted for rotation by plate 70 containing a bearing not shown and base 16 by bearing 49 therein. As temperature changes occur, the bimetallic helix 9 increases or decreases its helical length, causing shaft 15 to rotate proportionally, thus moving weight 34 through an arc in the horizontal plane. To properly compensate the change in force moment due to temperature-effected density changes, it is necessary to orient weight 34 such that its force moment will track changes in force moment of float 1 caused by temperature-effected density changes which follows a trigonometric sine function.

As a specific example of the temperature compensator for use with the particular float of the dimensions set forth above, the weight 34 is made of nickel-plated brass and weighs 10 grams plus or minus one gram. The weight 34 is oriented angularly such that at minus 20° F., it is 17½° towards the float 1 from pivot 14 and at 150° C., it is 42½° towards counterweight 17. (This orientation is noted in FIGURE 5 as $A^1$ and $A^{11}$, respectively.) The temperature helix 9 is 0.040 inch thick and a quarter inch wide and approximately 14 inches long wound on a one-inch diameter. The material is Truflex T675R furnished by the Metals and Controls Division of Texas Instruments Incorporated. Any bimetallic helix that varies linearly in helical length with temperature would be suitable. Hub 30 is SAE 72 yellow brass and rod 33 is Type 303 stainless steel; however, the particular material is a matter of choice.

The humidity compensator may best be understood by reference to FIGURES 4, 5, and 6B. The humidity compensator consists of two helical elements, a bimetallic helix 42, and a hygroscopic helix 43. A shaft 48, similar to the temperature compensator shaft 15, is positioned in the center of helices 42 and 43 and is concentric therewith. The shaft 48 is held in position for rotation by bearings appropriately located in top plate 70 and base 16. A boss 71 in top plate 70 is provided to secure bimetallic helix 42 by tightening set screw 46. The upper end of helix 42 is bent radially toward shaft 48, and is attached to temperature compensator weight 40 through bracket 45 and hub 47. Helix 42 is also attached to hygroscopic helix 43 by means of clip 44 through the connection with the upper end of helix 43 and radial portion of helix 42. The lower end of hygroscopic helix 43 is provided with a clip 51 by which it is attached to hub and bearing 72, as illustrated in FIGURE 6B. A set screw (not shown) clamps shaft 48 to hub 72. The humidity weight 41 is attached to shaft 48 at its upper end such that the shaft and weight 41 freely rotate as hygroscopic helix 43 expands or contracts, changing its helical length with an increase or decrease in its moisture content. Bracket 45 which is attached to one end of temperature compensating helix 42 is attached to temperature compensator weight 40, and is freely rotatable as temperature changes occur. Also, since temperature-compensating helix 42 is clipped to humidity helix 43 then, as temperature changes occur, the changing helical length of temperature compensator 42 is transmitted to humidity-compensator helix 43 which, in turn, is coupled through clip 51 and hub 72 to shaft 48, thereby rotating humidity-compensating weight 41.

The just described humidity-compensator movement provides a force moment compensation as a trigonometric sine function, which describes the change in force moment attributable to humidity-effected density changes. The angular orientation of humidity weight 41 and temperature-compensator weight 40 is adjusted such that the change in force moment caused by humidity-effected density changes will be equalized. This adjustment varies depending on the particular balance arrangement.

As a specific example of the humidity compensator which may be utilized with the exemplary balance system described, it contains a wood and metal element (helix 43) supplied by the Bristol Company, Waterbury, Connecticut as their part number 73543. Helix 43 is a hygroscopic element coiled on a ⅞ inch diameter and about 1½ inches long. The hygroscopic element consists of a thin strip of wood cemented to a strip of metal which changes its helical length linearly with relative humidity. The helix 43 provides rotational movement of shaft 48 through 66° for a change from 0% to 100% relative humidity. The humidity-temperature helix 42 is made from the same material as the temperature-compensator helix 9 except it is 0.025 inch thick, and is wound on a 1¼ inch diameter. Humidity-temperature helix 42 provides rotational movement of shaft 48 through helix 43 of 90° with a temperature change from 0° F. to 150° F. with no simultaneous change in relative humidity. Temperature-compensator weight 40 is oriented such that at 100° F. it is at an angle of 25° towards the rear of the detector, as viewed in FIGURES 2 and 5. (This orientation is noted in FIGURE 5 as B¹.) The humidity helix 43 at 50% relative humidity is oriented diametrically opposite weight 40. Weight 40 and weight 41 are effectively one-gram weights. The weight 40 and weight 41 are made of nickel-plated brass, but could be made of nickel silver or other suitable material.

The density-sensitive gas detector described herein as a specific example utilizing the pressure, temperature, and humidity compensators has been operated in the temperature range from −20° F. to 150° F. at barometric pressures ranging from 23 inches to 31 inches of mercury in relative humidities from 0% to 100% and detected density changes as low as 1.2% which were caused by the presence of undesirable gases.

It should be appreciated that modifications of the density-sensitive gas detector could be made which would provide a much lower threshold sensitivity of the balance system to variations in density created by undesirable gases. For instance, the float volume could be substantially increased, thereby creating a large total buoyant force change with small changes in density created by the presence of undesirable gases.

It should be appreciated that the novel features of the present invention incorporate the principle of providing pressure, temperature and humidity compensation for a gas detector which senses density variations in the surrounding atmosphere. Since pressure, temperature and humidity-effected density changes vary the force moments around the density-sensitive gas detector substantially in accordance with the perfect gas laws, the present invention advantageously employing this scientific law provides mechanical compensators for equalizing force moment variations created by environmental temperature, pressure and humidity changes. Moreover, the present invention incorporates into a density-sensitive gas detector a magnetic restraining system which allows adjustment of the threshold activation force. With this system, it is possible to establish a minimum percent density change which will provide sufficient force to activate the alarm system, yet remain insensitive to shock and vibration.

Many variations and modifications of the present invention will become readily apparent to those skilled in the art; however, it is intended that such changes and modifications be within the broad spirit and scope of the present invention, which is limited only by the appended claims.

What is claimed is:

1. In a gas detecting apparatus wherein the presence of an undesirable gas is detected by a counterbalanced hollow float containing gas changing the force moments around the fulcrum of a balance responsive to environmental density changes, a balance system having a balance arm, an apparatus for counter-vailing force moments about said balance system created by humidity-effected density changes comprising a bimetallic helix, a hygroscopic helix capable of changing in length at a linear rate along its helical periphery proportional to change in percentage of moisture saturation, bearing means located on said balance arm, shaft means rotationally mounted in said bearing means, means to attach one end of the hygroscopic helix to said shaft means, means to attach the other end of said hydroscopic helix to one end of the bimetallic helix, collar means rotationally mounted to surround said shaft means, means to attach said one end of the bimetallic helix to said collar means, means to affix the other end of said bimetallic helix in fixed space relation to said bearing means, weight means attached to said shaft adapted to describe an arc in a horizontal plane according to the rotation of said shaft means, and weight means attached to said collar means adapted to describe a horizontal arc when said collar means rotates to vary the force moment about said balance system.

2. In a gas detecting apparatus wherein the presence of an undesirable gas is detected by a counterbalanced hollow float containing a standard gas changing the force moments around the fulcrum of a balance responsive to environmental density changes, an apparatus for countervailing force moments about the balance system created by humidity-effected density changes comprising a bimetallic helix means, a hygroscopic helix means capable of changing in length at a linear rate along its helical periphery proportional to change in percentage of moisture saturation, and means coacting with said bimetallic helix means and said hygroscopic helix means thereby creating the countervailing force moments as a substantially sinusoidal function of relative humidity at varying temperatures.

3. In a density-sensitive gas detector wherein the presence of an undesirable gas creates unbalancing force moments, an apparatus for countervailing force moments created by atmospheric humidity, pressure and temperature effected density changes comprising a balance system having a balanced arm, a bimetallic helix, a hygroscopic helix capable of changing in length at a linear rate along its helical periphery proportional to change in percentage of moisture saturation, bearing means located on said balance arm, a shaft rotationally mounted in said bearing means, one end of said hygroscopic helix attached to said shaft, the other end of said hygroscopic helix attached to one end of the bimetallic helix, a collar means rotationally mounted surrounding said shaft, means to attach said one end of said bimetallic helix to said collar means, means to affix the other end of said bimetallic helix in rigid relation with said bearing means, weight means attached to said shaft adapted to describe an arc in the horizontal plane according to the rotation of said shaft means, weight means attached to said collar means adapted to describe a horizontal arc when said collar means rotates to vary the force moment about said balance system, means to countervail force moments about said balance system created by pressure changes and means to countervail force moments about said balance system created by temperature changes.

4. The apparatus of claim 3 wherein the means for countervailing force moments created by pressure variations comprises a pressure-responsive bellows means attached to the balance arm of said balance system, weight means attached to said bellows means arranged to vary the force moments about said balance system linearly with pressure variations.

5. The apparatus of claim 3 wherein the means for countervailing force moment about said balance system created by temperature-effected density changes comprises a bimetallic helix means, a weight means attached to said helix means, said weight means and said helix means coacting to vary the force moment about said balance system substantially as a sinusoidal function of temperature change.

6. The apparatus of claim 4 wherein the means for countervailing force moment about said balance system created by temperature-effected density changes comprises a bimetallic helix means, a weight means attached to said helix means, said weight means and said helix means coacting to vary the force moment about said balance system substantially as a sinusoidal function of temperature change.

References Cited in the file of this patent

UNITED STATES PATENTS

| | | |
|---|---|---|
| 826,659 | Hauger | July 24, 1906 |
| 2,106,966 | Binckley | Feb. 1, 1938 |
| 2,344,530 | Askew | Mar. 21, 1944 |
| 2,400,427 | Mabey | May 14, 1946 |